United States Patent
Sakai

(10) Patent No.: US 10,628,123 B2
(45) Date of Patent: Apr. 21, 2020

(54) IMAGE FORMING APPARATUS HAVING ERROR DETECTION AND AUDIO GUIDANCE

(71) Applicant: KYOCERA Document Solutions Inc., Osaka (JP)

(72) Inventor: Hiroyuki Sakai, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/421,088

(22) Filed: May 23, 2019

(65) Prior Publication Data

US 2019/0369956 A1 Dec. 5, 2019

(30) Foreign Application Priority Data

May 30, 2018 (JP) ................................ 2018-103838

(51) Int. Cl.
| | | |
|---|---|---|
| G03G 15/00 | (2006.01) | |
| G06F 3/00 | (2006.01) | |
| G06K 15/00 | (2006.01) | |
| G06F 3/16 | (2006.01) | |
| G06F 3/12 | (2006.01) | |
| G06F 3/01 | (2006.01) | |

(52) U.S. Cl.
CPC ......... G06F 3/167 (2013.01); G03G 15/5012 (2013.01); G03G 15/5016 (2013.01); G06F 3/011 (2013.01); G06F 3/121 (2013.01); G06K 15/408 (2013.01)

(58) Field of Classification Search
CPC ............. G03G 15/556; G03G 15/5012; G03G 15/502; G03G 15/553; G06F 3/167; G06F 3/121; G06F 3/011; G06F 3/1234; G06F 3/1235; G06K 15/4075; G06K 15/408
USPC .................................. 399/11, 25, 27, 31, 81
See application file for complete search history.

(56) References Cited

U.S. PATENT DOCUMENTS

| | | | |
|---|---|---|---|
| 7,272,793 B2 * | 9/2007 | Mutsuno ................. | G06F 9/453 715/707 |
| 2003/0133718 A1 * | 7/2003 | Kurtz ................. | G03G 15/5016 399/9 |
| 2004/0022548 A1 * | 2/2004 | Nagaoka ............ | G03G 15/5012 399/16 |
| 2005/0069336 A1 * | 3/2005 | Kotani ...................... | G06F 3/16 399/81 |
| 2010/0277762 A1 * | 11/2010 | Eguchi ............... | G03G 15/5016 358/1.15 |

(Continued)

FOREIGN PATENT DOCUMENTS

| | | | |
|---|---|---|---|
| JP | 58153954 A | * | 9/1983 |
| JP | 06301512 A | * | 10/1994 |

(Continued)

*Primary Examiner* — Robert B Beatty
(74) *Attorney, Agent, or Firm* — Stein IP, LLC

(57) ABSTRACT

After starting output of an audio guidance at a first volume, a control portion judges whether or not an image of a user is contained in image data, and also judges whether or not a cover has been opened, such that if no image of the user is contained in the image data and the cover is in a closed state, the control portion maintains the volume of the audio guidance at a first volume, whereas even if no image of the user is contained in the image data, when the cover is opened, the control portion changes the volume of the audio guidance to a second volume.

5 Claims, 3 Drawing Sheets

(56) References Cited

U.S. PATENT DOCUMENTS

2015/0281521 A1* 10/2015 Takeuchi .......... G03G 15/5016
399/81

FOREIGN PATENT DOCUMENTS

| JP | 2005102084 A | * | 4/2005 |
| JP | 2006013584 A | * | 1/2006 |
| JP | 2006-30359 A | | 2/2006 |

* cited by examiner

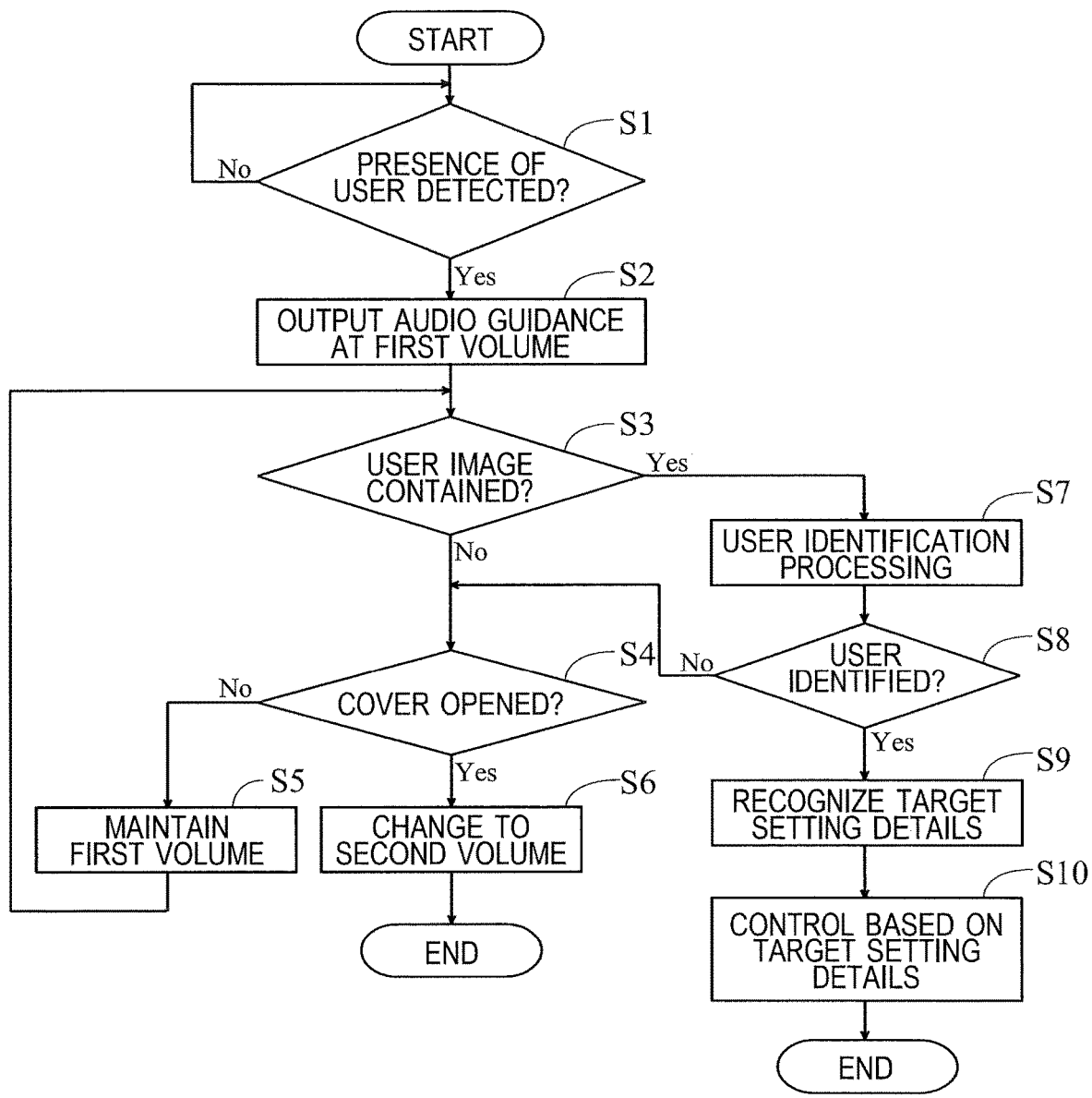

IMAGE FORMING APPARATUS HAVING ERROR DETECTION AND AUDIO GUIDANCE

INCORPORATION BY REFERENCE

This application is based upon and claims the benefit of priority from the corresponding Japanese Patent Application No. 2018-103838 filed on May 30, 2018, the entire contents of which are incorporated herein by reference.

BACKGROUND

The present disclosure relates to an image forming apparatus.

Conventionally, there have been known image forming apparatuses provided with a speaker. With a speaker provided in an image forming apparatus, it is possible to output an audio guidance through the speaker.

For example, in a case where an error has occurred in the image forming apparatus, it is possible to output, through the speaker, an audio guidance to the effect that the error has occurred, to thereby help a user become aware of the occurrence of the error. Furthermore, with the audio guidance output from the speaker regarding the occurred error having occurred in the image forming apparatus, it is possible for the user to perform an operation to clear the occurred error with the help of the audio guidance, and this contributes to improved user-friendliness of the image forming apparatus.

Here, even when an audio guidance is output from the speaker when an error has occurred in the image forming apparatus, if the audio guidance is given at a low volume, the user may not be able to become aware of the audio guidance, and this is inconvenient. To reduce occurrence of such inconvenience to the user, for example, the audio guidance is output from the speaker at a relatively high volume. However, when the user is performing an operation with respect to the image forming apparatus (that is, when the user is located close to the image forming apparatus), a high-volume audio guidance output from the speaker is sometimes annoying to him/her.

SUMMARY

According to the present disclosure, an image forming apparatus includes a camera, a human sensor, a cover, an opening/closing sensor, a speaker, and a control portion. The camera performs image shooting. The human sensor detects presence of a user. The cover is openably and closably provided and is opened when the user performs an error clearing operation to clear an error having occurred in the image forming apparatus. The opening/closing sensor detects opening/closing of the cover. The speaker outputs an audio guidance regarding the error. The control portion outputs the audio guidance by using the speaker and controls volume of the audio guidance. Here, after the error has occurred, when the control portion has detected that the user is present based on an output value of the human sensor, the control portion starts output of the audio guidance by using the speaker at a first volume which has been determined in advance, and after starting the output of the audio guidance, the control portion judges whether or not an image of the user is contained in image data obtained by the camera, and also judges whether or not the cover has been opened based on an output value of the opening/closing sensor, such that the control portion maintains the volume of the audio guidance at the first volume if no image of the user is contained in the image data and the cover is in a closed state, whereas, even if no image of the user is contained in the image data, when the cover is opened, the control portion changes the volume of the audio guidance from the first volume to a second volume which has been determined in advance and is lower than the first volume.

BRIEF DESCRIPTION OF THE DRAWINGS

FIG. 4 is a flow chart showing the flow of processing performed by a control portion of the image forming apparatus according to the embodiment of the present disclosure.

DETAILED DESCRIPTION

Figure 1:
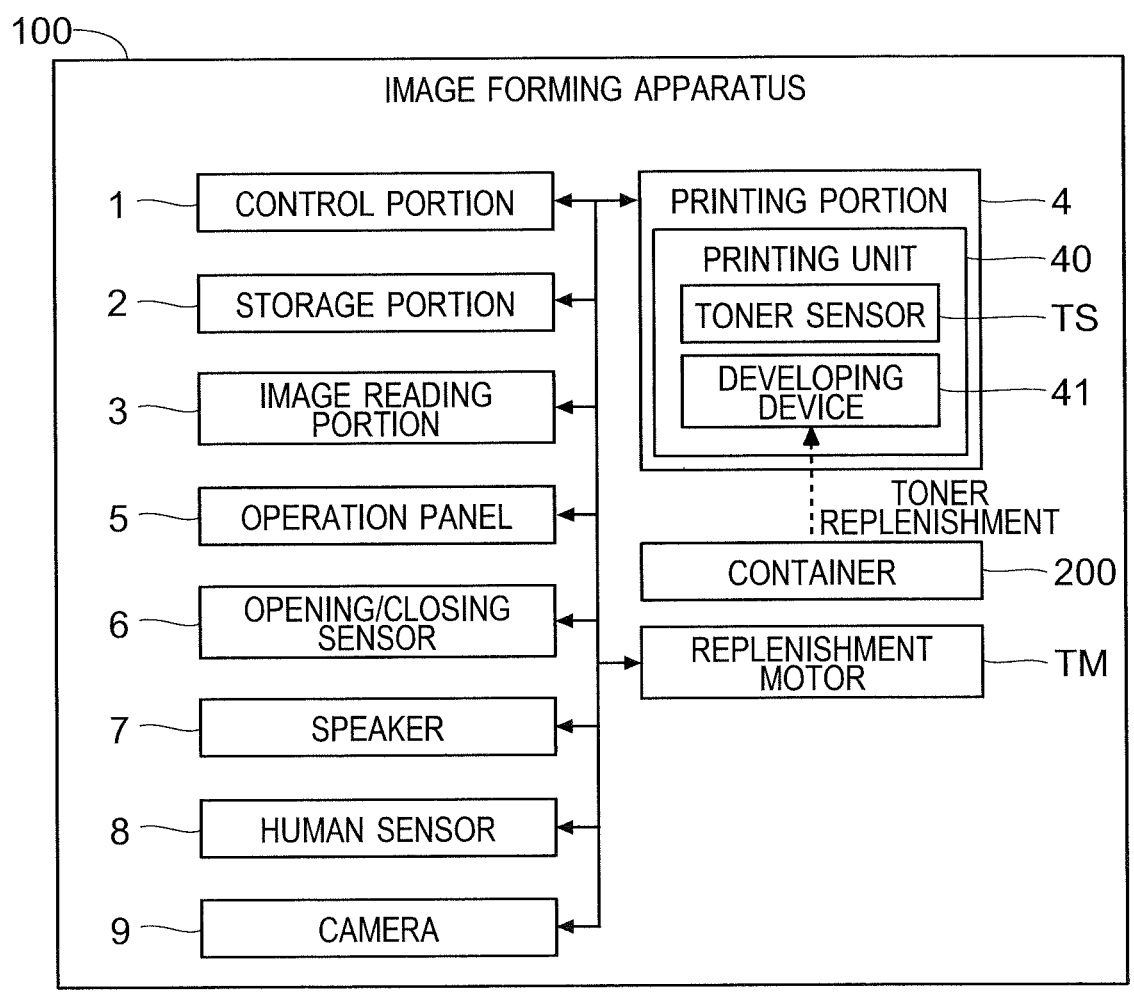
FIG. 1 is a block diagram illustrating an entire configuration of an image forming apparatus according to an embodiment of the present disclosure.

Configuration of Image Forming Apparatus: As shown in FIG. 1, an image forming apparatus 100 of the present embodiment includes a control portion 1 and a storage portion 2. The control portion 1 includes a CPU. The control portion 1 operates based on control programs and control data, and performs processing for controlling the image forming apparatus 100. The storage portion 2 includes a ROM and a RAM. The storage portion 2 stores the control programs and the control data. The storage portion 2 is connected to the control portion 1. The control portion 1 reads and writes information from and to the storage portion 2.

The image forming apparatus 100 further includes an image reading portion 3. The image reading portion 3 reads a document to generate image data. The image reading portion 3 is connected to the control portion 1. The control portion 1 controls the reading operation of the image reading portion 3.

The image reading portion 3 includes a light source and an image sensor, of which neither is illustrated. The light source irradiates the document with light. The image sensor receives light reflected from the document to perform photoelectric conversion on the received light.

The image forming apparatus 100 further includes a printing portion 4. The printing portion 4 forms an image (a toner image) and performs a printing job to print the image on a sheet. For example, the printing portion 4 performs printing of an image based on image data of a document having been read by the image reading portion 3 onto a sheet. The printing portion 4 is connected to the control portion 1. The control portion 1 controls the printing operation of the printing portion 4 (printing jobs executed by the printing portion 4).

The printing portion 4 includes a printing unit 40 which includes a photosensitive drum (not shown). In executing the print job, the printing unit 40 develops an electrostatic latent image formed on a peripheral surface of the photosensitive drum into a toner image, and transfers (prints) the toner image onto a sheet. For developing an electrostatic latent image into a toner image, the printing unit 40 is provided with a developing device 41. The developing device 41 accommodates toner to be used in the printing job. The developing device 41 supplies the toner to an electrostatic latent image to develop it into a toner image.

The toner in the developing device 41 is consumed each time a printing job is executed. Thus, it is necessary to replenish toner to the developing device 41. Thus, the image forming apparatus 100 has attached thereto a container 200, in which the toner to be replenished (toner to be used in the printing job) is accommodated.

Figure 2:
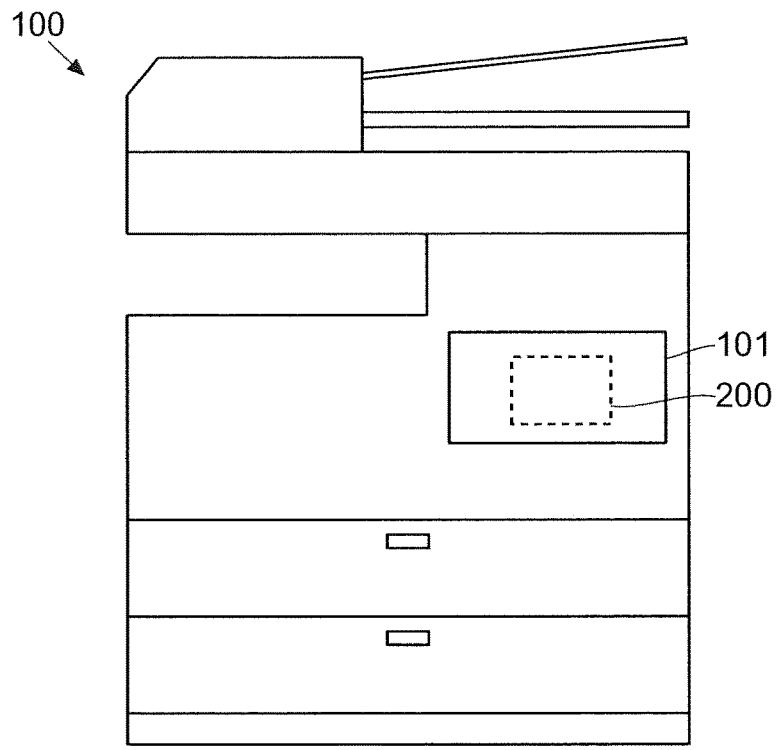
FIG. 2 is a diagram showing the arrangement position of a cover that is openably and closably provided on the image forming apparatus according to the embodiment of the present disclosure.

The container 200 is attachable and detachable (replaceable) to and from a main body of the image forming apparatus 100. For example, as shown in FIG. 2, the image forming apparatus 100 includes a cover 101 which is openably and closably provided on its front face. By opening the cover 101, an attachment space for the container 200 is exposed. This makes it possible, when the container 200 becomes empty, to replace the empty container 200 with a new container 200. That is, the user opens the cover 101 to perform a container-200 replacement operation to replace the container 200 with a new one.

Figure 3:
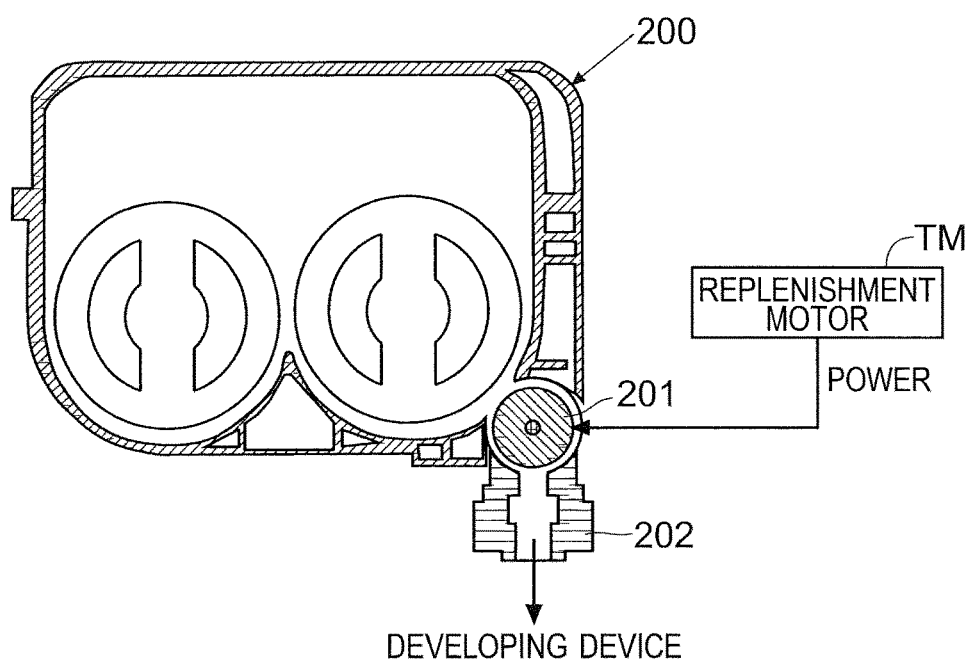
FIG. 3 is a diagram showing the configuration of a container attached to the image forming apparatus according to the embodiment of the present disclosure.

As shown in FIG. 3, the toner is replenished from the container 200 into the developing device 41 by using a replenishment screw 201. The replenishment screw 201 may be provided in the container 200, or may be provided in the main body of the image forming apparatus 100. To the position of the replenishment screw 201, a replenishment pipe 202 is connected. When the container 200 is attached to the image forming apparatus 100, the container 200 and the developing device 41 are connected to each other via the replenishment pipe 202.

The replenishment screw 201 rotates by receiving power from the replenishment motor TM. For replenishment of the toner from the container 200 to the developing device 41, the replenishment screw 201 rotates to cause the toner to fall from the container 200. The toner having fallen from the container 200 is replenished via the replenishment pipe 202 into the developing device 41. The replenishment motor TM is connected to, and controlled by, the control portion 1.

Referring back to FIG. 1, to the control portion 1, there is connected a toner sensor TS for detecting the toner accommodated in the developing device 41. Though there is no particular limitation on the toner sensor TS, the toner sensor TS is an optical sensor having a light emitting portion and a light receiving portion. The toner sensor TS changes its output value in accordance with the pile height of the toner accommodated in the developing device 41. When there is a sufficient amount of toner remaining in the developing device 41, the optical path (between the light emitting portion and the light receiving portion) of the toner sensor TS is blocked, and a first-level signal is output from the toner sensor TS. On the other hand, when the amount of toner accommodated in the developing device 41 is reduced, the optical path of the toner sensor TS becomes unblocked, and a second-level signal is output from the toner sensor TS.

Based on the output value of the toner sensor TS, the control portion 1 judges whether or not it is necessary to replenish the toner from the container 200 to the developing device 41. In a case where the control portion 1 has detected that the output value of the toner sensor TS has turned to the second level, the control portion 1 judges that it is necessary to replenish the toner to the developing device 41, and activates the replenishment motor TM. Thereby, the replenishment screw 201 is caused to rotate, and the toner is replenished from the container 200 into the developing device 41. After the toner replenishment is started, in a case where the control portion 1 has detected that the output value of the toner sensor TS has turned to the first level, the control portion 1 finishes the toner replenishment. In this way, when the amount of toner in the developing device 41 is reduced during execution of a printing job, the toner of the amount corresponding to the reduction is replenished to the developing device 41.

If the output value of the toner sensor TS does not turn to the first level despite though a predetermined time has passed since the start of the toner replenishment, the control portion 1 judges that the container 200 is in an empty state. If the container 200 is in the empty state, the control portion 1 judges that an error (exhaustion of the toner in the container 200) has occurred in the image forming apparatus 100.

The image forming apparatus 100 further includes an operation panel 5. The operation panel 5 accepts various instructions including an instruction on job setting regarding a printing job, an instruction on guidance setting regarding an audio guidance, etc. To accept an instruction from the user, the operation panel 5 is provided with a touch screen and hardware buttons. The operation panel 5 accepts a touch operation performed with respect to the touch screen and a pressing operation performed with respect to the hardware buttons as an instruction from the user.

The operation panel 5 is connected to the control portion 1. The control portion 1 controls the display operation of the operation panel 5. Further, the control portion 1 detects operations performed with respect to the operation panel 5 (operations performed with respect to the touch screen and operations performed with respect to the hardware buttons).

The operation panel 5 functions as a notification portion for notifying the user of the state of the image forming apparatus 100. For example, when an error occurs in the image forming apparatus 100, the control portion 1 makes the operation panel 5 display a screen indicating error information regarding the occurred error. When the occurred error is toner exhaustion, error information regarding the toner exhaustion is displayed on the operation panel 5. There is no particular limitation on the contents of the error information regarding toner exhaustion. A message to the effect that the toner in the container 200 has been exhausted, a message urging the user to perform the container-200 replacement operation, a message indicating the procedure of the container-200 replacement operation, etc., may be displayed on the operation panel 5 as the error information.

The control portion 1 judges whether or not the user has performed the container-200 replacement operation after the error information regarding toner exhaustion is displayed on the operation panel 5. When the control portion 1 has judged that the container-200 replacement operation has been performed, the control portion 1 finishes the display of the error information by the operation panel 5.

To allow the control portion 1 to judge whether or not the container-200 replacement operation has been performed, the image forming apparatus 100 is provided with an opening/closing sensor 6 for detecting the opening/closing of the cover 101. For example, an interlock switch, an optical sensor, or the like is used as the opening/closing sensor 6. The opening/closing sensor 6 changes its output value between when the cover 101 is in the opened state and when the cover 101 is in the closed state.

The opening/closing sensor 6 is connected to the control portion 1. The control portion 1 detects the opening/closing of the cover 101 based on the output value of the opening/closing sensor 6. That is, the control portion 1 detects that the cover 101 has been opened from the closed state. The control portion 1 also detects that the cover 101 has been closed from the opened state.

To start the container-200 replacement operation, the user opens the cover 101. When the container-200 replacement operation is completed, the user closes the cover 101. Thus, when the container-200 replacement operation is performed by the user, the cover 101 is opened and closed.

Accordingly, when the control portion 1 has detected that the cover 101 has been opened and closed while the error information regarding toner exhaustion is being displayed, the control portion 1 judges that the container-200 replacement operation has been completed by the user, and finishes the display of the error information on the operation panel 5. Here, the display of the error information may be finished when the cover 101 is opened from the closed state (that is, when the user has started the container-200 replacement operation), or may be finished when the cover 101 is closed from the opened state (that is, when the user has completed the container-200 replacement operation).

The image forming apparatus 100 further includes a speaker 7. The speaker 7 outputs an audio guidance regarding an error occurred in the image forming apparatus 100. The audio data of the audio guidance to be output from the speaker 7 is stored in the storage portion 2.

The speaker 7 is connected to the control portion 1. The control portion 1 controls the output of the audio guidance from the speaker 7. To output the audio guidance from the speaker 7, the control portion 1 inputs the audio data of the audio guidance into the speaker 7 to make the speaker 7 reproduce the audio guidance. The control portion 1 also adjusts the volume of the audio guidance output from the speaker 7.

The image forming apparatus 100 further includes a human sensor 8. The human sensor 8 is a sensor for detecting the presence of the user around the image forming apparatus 100 (within the detection range of the human sensor 8). There is no particular limitation on the kind of the human sensor 8, the human sensor 8 can be, for example, a pyroelectric infrared sensor, an ultrasonic sensor, or the like.

The human sensor 8 is connected to the control portion 1. The control portion 1 detects the presence of a user around the image forming apparatus 100 based on the output value of the human sensor 8. Here, when an error has occurred in the image forming apparatus 100, a user who is going to perform the error clearing operation for clearing the occurred error approaches the image forming apparatus 100. Accordingly, the provision of the human sensor 8 in the image forming apparatus 100 to be connected to the control portion 1 allows the control portion 1 to judge whether or not a user who is going to perform the error clearing operation is present around the image forming apparatus 100.

The image forming apparatus 100 further includes a camera 9. The camera 9 shoots images of an area surrounding the image forming apparatus 100. The camera 9 is connected to the control portion 1. The control portion 1 controls image shooting performed by the camera 9, and also acquires image data obtained by the camera 9.

The camera 9 is disposed at a position that allows the camera 9 to shoot an image of the face of a user when he/she looks at the screen of the operation panel 5. For example, the camera 9 is disposed on the operation panel 5. Here, the pointing direction of the operation panel 5 (the direction in which the screen of the operation panel 5 points) is freely changeable. By changing the direction of the operation panel 5, the pointing direction of the camera 9 (and thus the shooting range of the camera 9) is also changed. For example, it is possible to make the camera 9 point in a direction forward from the front face of the image forming apparatus 100.

Output of Audio Guidance: In a case where the control portion 1 has judged that an error has occurred in the image forming apparatus 100, the control portion 1 performs error-occurrence-time processing. The error-occurrence-time processing is performed by the control portion 1 in a case where the error having occurred in the image forming apparatus 100 is toner exhaustion.

The control portion 1 performs, as part of the error-occurrence-time processing, after the occurrence of the error in the image forming apparatus 100, first judgment processing of judging whether or not a user is present around the image forming apparatus 100 based on the output value of the human sensor 8. Here, when the control portion 1 has detected that the output value of the human sensor 8 has become a value that indicates the presence of a user, the control portion 1 judges that a user is present around the image forming apparatus 100.

The control portion 1 also performs, as part of the error-occurrence-time processing, second judgment processing of judging whether or not an image of a user is contained in the image data obtained by the camera 9. The image shooting performed by the camera 9 may be started when an error has occurred in the image forming apparatus 100. Or, the image shooting performed by the camera 9 may be started when, after the occurrence of an error in the image forming apparatus 100, the control portion 1 has judged that a user is present based on the output value of the human sensor 8. In whichever case, the image data obtained by the camera 9 after the occurrence of an error in the image forming apparatus 100 is used in the second judgment processing.

The control portion 1 also performs, as part of the error-occurrence-time processing, third judgment processing of judging, based on the output value of the opening/closing sensor 6, whether or not the cover 101 has been opened (whether or not a user has opened the cover 101). Note that the cover 101 is in the closed state at the time point when an error has occurred in the image forming apparatus 100.

The control portion 1 also performs, as part of the error-occurrence-time processing, guidance output processing for outputting (reproducing) an audio guidance regarding an error that has occurred in the image forming apparatus 100. The control portion 1 controls the output (the reproduction) of the audio guidance based on the results of the first judgment processing, the second judgment processing, and the third judgment processing. Performed by the control portion 1 in the guidance output processing are the adjustment of the volume, the switching of the on/off, and so forth, of the audio guidance.

Hereinafter, with reference to the flow chart shown in FIG. 4, a description will be given of the flow of the error-occurrence-time processing performed by the control portion 1. In the flow chart shown in FIG. 4, the flow starts when the control portion 1 judges that an error (toner exhaustion) has occurred in the image forming apparatus 100.

In step S1, the control portion 1 judges whether or not the presence of a user has been detected (whether or not the output value of the human sensor 8 has become a value that indicates the presence of a user). In other words, the control portion 1 judges whether or not a user is present around the image forming apparatus 100. That is, the control portion 1 performs the first judgment processing. In a case where, as a result, the control portion 1 has judged that the presence of a user has been detected, the flow proceeds to step S2, whereas in a case where the control portion 1 has judged that the presence of a user has not been detected, the process in step S1 is repeated.

In step S2, the control portion 1 sets the volume of audio guidance to a first volume (a volume that is higher than a later-described second volume), which has been determined in advance. Then, the control portion 1 starts output of an audio guidance at the first volume by using the speaker 7. Here, the audio guidance regarding the error of toner exhaustion includes a first guidance and a second guidance. The first guidance is for notifying the user that the error of toner exhaustion has occurred. The second guidance is for notifying the user of the procedure of the error clearing operation (that is, the container-200 replacement operation) to be performed to clear the error of toner exhaustion.

The control portion 1 outputs the first guidance from the speaker 7 when the cover 101 is in the closed state, and outputs the second guidance from the speaker 7 when the cover 101 is in the opened state. At the time of step S2, the cover 101 is in the closed state, and thus the first guidance is output from the speaker 7.

After the output of audio guidance at the first volume is started, the flow proceeds to step S3. In step S3, the control portion 1 judges whether or not an image of a user is contained in the image data obtained by the camera 9. That is, the control portion 1 performs the second judgment processing. In a case where, as a result, the control portion 1 has judged that no image of a user is contained in the image data, the flow proceeds to step S4.

In step S4, the control portion 1 judges, based on the output value of the opening/closing sensor 6, whether or not the cover 101 has been opened. That is, the control portion 1 performs the third judgment processing.

In step S4, in a case where the control portion 1 has judged that the cover 101 is not in the opened state (but stays in the closed state), the flow proceeds to step S5. In step S5, the control portion 1 maintains the volume of audio guidance at the first volume. That is, in this case, the audio guidance continues to be output at the first volume from the speaker 7. Then, the flow proceeds to step S3.

For example, even when a user is present around the image forming apparatus 100, if the user is not aware of the audio guidance being output from the speaker 7, the user does not approach the image forming apparatus 100. That is, the user does not take a look at the screen of the operation panel 5 (the error information displayed on the operation panel 5), and thus the user does not come into the shooting range of the camera 9; as a result, no image of the user is contained in the image data obtained by the camera 9. Further, if the user does not approach the image forming apparatus 100, the user does not perform the container-200 replacement operation, and thus the cover 101 remains in the closed state. Accordingly, in this case (in the case where "No" is obtained as the result of judgment in step S4), it is preferable to continue the output of the audio guidance at the first volume from the speaker 7 in order to urge the user to perform the container-200 replacement operation.

In a case where, in step S4, the control portion 1 has judged that the cover 101 has been opened, the flow proceeds to step S6. In step S6, the control portion 1 changes the volume of the audio guidance to the second volume, which has been determined in advance and is lower than the first volume. At this time, the control portion 1 changes the audio guidance to be output from the speaker 7 from the first guidance to the second guidance.

For example, if the user who is present around the image forming apparatus 100 becomes aware of the audio guidance being output from the speaker 7, he/she approaches the image forming apparatus and opens the cover 101 to perform the container-200 replacement operation. There may be a case where the user approaches the image forming apparatus 100 from a direction outside the shooting range of the camera 9. Then, if the user who has approached the image forming apparatus 100 is used to operating the image forming apparatus 100, he/she can start the container-200 replacement operation (can open the cover 101) without taking a look at the screen of the operation panel 5 (that is, the error information displayed on the operation panel 5). In such a case, the cover 101 is brought into the opened state even if no image of the user is contained in the image data obtained by the camera 9.

The cover 101 having been opened means that the user is performing the container-200 replacement operation. In this situation, if the audio guidance is output from the speaker 7 at the first volume (which is higher than the second volume), the audio guidance annoys the user. Thus, even if no image of the user is contained in the image data obtained by the camera 9, when the cover 101 is in the opened state, it is preferable, assuming that the user has already started the container-200 replacement operation, to change the volume of the audio guidance output from the speaker 7 to the second volume, which is lower than the first volume.

In a case where, in step S3, the control portion 1 has judged that an image of the user is contained in the image data obtained by the camera 9, the flow proceeds to step S7. In step S7, the control portion 1 performs user identification processing to identify the user (a subject user) whose image is contained in the image data.

To allow the control portion 1 to perform the user identification processing, a feature point in the face of the user of the image forming apparatus 100 is registered in advance, and the registered feature point which has been registered is stored in a face database. The user is one of a plurality of users of the image forming apparatus 100, and a plurality of registered feature points respectively corresponding to the plurality of users are stored in the face database. The face database is stored in the storage portion 2.

Here, in the storage portion 2, there are also stored guidance setting details of the guidance setting regarding the audio guidance which have been set in advance by a user of the image forming apparatus 100. Since the user is one of the plurality of users of the image forming apparatus 100, a plurality of guidance settings respectively corresponding to the plurality of users are stored in the storage portion 2. For example, each user sets in advance the volume, the on/off, and so forth of the audio guidance, and the set setting details are stored in the storage portion 2.

The control portion 1, when performing the user identification processing, uses known image recognition processing (face recognition processing) to extract the face image of a subject user from the image data obtained by the camera 9, and analyzes the extracted face image to thereby recognize the feature point in the extracted face image. Further, the control portion 1 retrieves, from the face database, a registered feature point having a similarity degree equal to or higher than a predetermined threshold value with respect to the feature point of the extracted face image. Then, the control portion 1 identifies, as the subject user, a user corresponding to the registered feature point having the similarity degree that is equal to or higher than the threshold value with respect to the feature point of the extracted face image.

After the user identification processing by the control portion 1 is finished, the flow proceeds to step S8. In step S8, the control portion 1 judges whether or not it has been successfully identified who the user (the subject user) is whose image is contained in the image data obtained by the camera 9. At this time point, the volume of the audio guidance is the first volume. That is, even if an image of a user is contained in the image data obtained by the camera 9, the volume of the audio guidance is not changed immediately.

In a case where, in step S8, the control portion 1 has judged that it has not been successfully identified who the subject user is, the flow proceeds to step S4. In step S4, when the cover 101 is in the closed state, the volume of the audio guidance is maintained at the first volume (that is, the flow proceeds to step S5). On the other hand, when the cover 101 is opened, the volume of the audio guidance is changed to the second volume (that is, the flow proceeds to step S6). That is, the same processing is performed as in the case where no image of the user is contained in the image data obtained by the camera 9.

In a case where, in step S8, the control portion 1 has judged that it has been successfully identified who the subject user is, the flow proceeds to step S9. In step S9, the control portion 1 recognizes the setting details of the guidance setting that correspond to the subject user as target setting details. Then, in step S10, the control portion 1 controls the output of the audio guidance by the speaker 7 based on the target setting details.

For example, in a case where the subject user (the user identified by the control portion 1 through the user identification processing) has set the volume of the audio guidance to a given volume (a user-specified volume), the control portion 1 changes the volume of the audio guidance to the user-specified volume. In a case where the subject user has set the on/off of the audio guidance such that the audio guidance is OFF, the control portion 1 finishes the output of audio guidance by the speaker 7.

Note that, in step S3, where the control portion 1 judges whether or not an image of a user is contained in the image data obtained by the camera 9, there is a case where images of two or more users are contained in the image data. That is, there is a case where a plurality of subject users are present. In such a case as well, the flow proceeds to step S7 and the user identification processing is performed by the control portion 1, and when the user identification processing by the control portion 1 is finished, the flow proceeds to step S8.

Here, even if a plurality of subject users are present, not all of them are necessarily looking toward the camera 9. If none of the subject users is looking toward the camera 9, the control portion 1 can recognize no face, and thus cannot identify who the subject users are. In this case, the flow proceeds from step S8 to step S4. That is, the same processing is performed as in the case where no image of the user is contained in the image data obtained by the camera 9.

On the other hand, if at least one of the plurality of subject users is looking toward the camera 9, the control portion 1 can recognize his/her face. In a case where the face of just one subject user is recognized, the control portion 1 performs the user identification processing with respect to the one subject user's face as a target. In a case where, as a result, the control portion 1 has succeeded in identifying the user, the flow proceeds to step S9, whereas in a case where the control portion 1 has failed to identify the user, the flow proceeds to step S4.

In a case where faces of two or more users have been recognized, the control portion 1 selects one of them (for example, the first recognized face), and performs the user identification processing with respect to the selected face as a target. In a case where, as a result, the control portion 1 has succeeded in identifying the selected user, the user identification processing is not performed with respect to the faces of the other users as targets, and the flow proceeds to step S9. In a case where the control portion 1 has failed to identify the selected user, the control portion 1 newly selects another user from the unselected users, and performs the user identification processing again with respect to the face of the newly selected user as the target. If the control portion 1 has failed to identify any user despite having performed the user identification processing with respect to all the recognized faces as the targets, the flow proceeds to step S4.

The image forming apparatus 100 of the present embodiment includes, as described above, the camera 9 which performs image shooting, the human sensor 8 for detecting the presence of a user, the cover 101 which is openably and closably provided and is opened when the user performs the error clearing operation (the container-200 replacement operation) to clear an error (toner exhaustion in the container 200) occurred in the image forming apparatus 100, the opening/closing sensor 6 for detecting the opening/closing of the cover 101, the speaker 7 for outputting an audio guidance regarding the error, and the control portion 1 which outputs the audio guidance by using the speaker 7 and adjusts the volume of the audio guidance. After an error occurs in the image forming apparatus 100, when the control portion 1 has detected the presence of a user based on the output value of the human sensor 8, the control portion 1 starts output of the audio guidance at the first voltage by the speaker 7. After starting the output of the audio guidance, the control portion 1 judges whether or not an image of the user is contained in image data obtained by the camera 9, and also judges whether or not the cover 101 has been opened based on the output value of the opening/closing sensor 6. If no image of the user is contained in the image data and the cover 101 is in the closed state, the control portion 1 maintains the volume of the audio guidance at the first volume, and even if no image of the user is contained in the image data, when the cover 101 is opened, the control portion 1 changes the volume of the audio guidance to the second volume, which has been determined in advance and is lower than the first volume.

In the configuration of the present embodiment, the control portion 1 detects the presence of a user based on the output value of the human sensor 8. The control portion 1 also judges whether or not an image of the user is contained in the image data obtained by the camera 9. The control portion 1 further judges whether or not the cover 101 has been opened (whether or not the user has opened the cover 101) based on the output value of the opening/closing sensor 6. Thereby, it is possible to make the control portion 1, which adjusts the volume of the audio guidance, recognize the state of the user (specifically, where the user is located and what the user is doing). As a result, it is possible to adjust the volume of the audio guidance automatically in accordance with the state of the user.

Here, there is a case where, although no image of the user is contained in the image data obtained by the camera 9, the user is performing the error clearing operation (that is, the cover 101 is in the opened state). However, it is also possible that no image of the user is contained in the image data because the user is not performing the error clearing operation (that is, the cover 101 is not in the opened state). With this in mind, if no image of the user is contained in the image data and the cover 101 is in the closed state, the control portion 1 maintains the volume of the audio guidance at the first volume. On the other hand, even if no image of the user is contained in the image data, when the cover 101 is opened, the control portion 1 changes the volume of the audio guidance to the second volume, which is lower than the first volume. This makes it possible to reduce occurrence of such inconvenience that the audio guidance is output from the speaker 7 at a high volume though the user is performing the error clearing operation (that is, the user is near the image forming apparatus 100).

Furthermore, in the present embodiment, as described above, the storage portion 2 stores, on a user-by-user basis, the setting details of guidance setting (for example, the volume of the audio guidance and the on/off of the audio guidance) regarding the audio guidance having been set in advance by each user. After the output of the audio guidance is started, if an image of a user is contained in the image data obtained by the camera 9, the control portion 1 performs the user identification processing to identify the user whose image is contained in the image data, and the control portion 1 controls the output of the audio guidance based on the setting details of the guidance setting which correspond to the user having been identified through the user identification processing. Thereby, when the user is going to start the error clearing operation (that is, when the user has approached the image forming apparatus 100), the user does not have to operate the operation panel 5 to have the output of the audio guidance controlled based on the setting details that the user himself/herself has set in advance, and this is convenient to the user.

Here, in a case where, as a result of performing the user identification processing, the control portion 1 has failed to identify the user whose image is contained in the image data obtained by the camera 9, the control portion 1 maintains the volume of the audio guidance at the first volume when the cover 101 is in the closed state, and, when the cover 101 is opened, the control portion 1 changes the volume of the audio guidance to the second volume. This prevents the audio guidance from being output continuously at a high volume.

In the present embodiment, as described above, the control portion 1 outputs the first guidance (a guidance for notification of occurrence of an error) when the cover 101 is in the closed state, and outputs the second guidance (a guidance for notification of the procedure of the error clearing operation) when the cover 101 is in the opened state. Thus, when the user has started the error clearing operation (that is, when the user has opened the cover 101), the guidance is automatically switched without the uses operating the operation panel 5, and this is convenient to the user.

It should be understood that the embodiments disclosed herein are merely illustrative in all respects, and should not be interpreted restrictively. The range of the present disclosure is shown not by the above descriptions of embodiments but the scope of claims for patent, and it is intended that all modifications within the meaning and range equivalent to the scope of claims for patent are included.

For example, although the above embodiment has dealt with the output control of the audio guidance output from the speaker when toner exhaustion has occurred, but the present disclosure is by no means limited to this. In a case of an error (for example, jam and the like) other than toner exhaustion as well, an audio guidance regarding the error may be output from the speaker and the same control may be performed as the output control of the audio guidance performed when toner exhaustion has occurred.

What is claimed is:

1. An image forming apparatus comprising:

a camera which captures an image of a user;

a human sensor which detects presence of the user;

a cover which is openably and closably provided and is opened when the user performs an error clearing operation to clear an error having occurred in the image forming apparatus;

an opening/closing sensor which detects opening and closing of the cover;

a speaker which outputs an audio guidance regarding the error; and a control portion which outputs the audio guidance by using the speaker and adjusts volume of the audio guidance, wherein after the error has occurred, when the control portion has detected that the user is present based on an output value of the human sensor, the control portion starts output of the audio guidance by using the speaker at a first volume which has been determined in advance, and after starting the output of the audio guidance, the control portion judges whether or not an image of the user is contained in image data obtained by the camera, and also judges whether or not the cover has been opened based on an output value of the opening/closing sensor, such that the control portion maintains the volume of the audio guidance at the first volume if no image of the user is contained in the image data and the cover is in a closed state, whereas, even if no image of the user is contained in the image data, when the cover is opened, the control portion changes the volume of the audio guidance from the first volume to a second volume which has been determined in advance and is lower than the first volume.

2. The image forming apparatus according to claim 1, wherein the user is one of a plurality of users of the image forming apparatus, the image forming apparatus further comprises a storage portion which stores, on a user-by-user basis, setting details of guidance setting regarding the audio guidance having been set in advance by each of the plurality of users, and after starting the output of the audio guidance, if an image of the user is contained in the image data, the control portion performs user identification processing to identify the user whose image is contained in the image data, and controls the output of the audio guidance based on the setting details of the guidance setting corresponding to the user having been identified through the user identification processing.

3. The image forming apparatus according to claim 2, wherein in a case where, as a result of performing the user identification processing, the control portion has failed to identify the user whose image is contained in the image data, the control portion maintains the volume of the audio guidance at the first volume when the cover is in the closed state, and the control portion changes the volume of the audio guidance to the second volume when the cover is opened.

4. The image forming apparatus according to claim 1, wherein the audio guidance includes a first guidance for notification of occurrence of the error, and a second guidance for notification of a procedure of the error clearing operation, and the control portion outputs the first guidance when the cover is in the closed state, and outputs the second guidance when the cover is in an opened state.

5. The image forming apparatus according to claim 1, further comprising:

a container which is replaceably attached to the image forming apparatus, and in which toner is accommodated; and a printing portion which prints an image on a sheet by using the toner accommodated in the container, wherein the cover is opened when the user performs container replacement operation, and when the container has become empty, the control portion judges that the error has occurred.

\* \* \* \* \*